US012642265B2

(12) United States Patent
Khait et al.

(10) Patent No.: US 12,642,265 B2
(45) Date of Patent: Jun. 2, 2026

(54) SYSTEM FOR DUAL LINE SPRAYING OF AN AGRICULTURAL FIELD

(71) Applicant: Centure Applications LTD, Tel-Aviv (IL)

(72) Inventors: Itzhak Khait, Kibbutz ein Zivan (IL); Amir Berger, Kiryat Bialik (IL)

(73) Assignee: Centure Applications LTD, Tel Aviv-Jaffa (IL)

( * ) Notice: Subject to any disclaimer, the term of this patent is extended or adjusted under 35 U.S.C. 154(b) by 336 days.

(21) Appl. No.: 18/450,672

(22) Filed: Aug. 16, 2023

(65) Prior Publication Data

US 2024/0245044 A1     Jul. 25, 2024

Related U.S. Application Data

(60) Provisional application No. 63/481,241, filed on Jan. 24, 2023.

(51) Int. Cl.
　　*A01M 7/00*　　　(2006.01)
　　*A01C 23/00*　　　(2006.01)
　　*A01C 23/04*　　　(2006.01)

(52) U.S. Cl.
　　CPC ......... *A01M 7/0089* (2013.01); *A01C 23/008* (2013.01); *A01C 23/047* (2013.01);
　　(Continued)

(58) Field of Classification Search
　　CPC .. A01M 7/0089; A01M 7/0042; A01M 7/006; A01M 7/0085; A01C 23/008; A01C 23/047
　　See application file for complete search history.

(56) References Cited

U.S. PATENT DOCUMENTS

| | | | | |
|---|---|---|---|---|
| 5,433,380 | A | * | 7/1995 | Hahn .................. A01M 7/0085 239/113 |
| 6,148,863 | A | * | 11/2000 | Memory ............. A01M 7/0085 137/262 |

(Continued)

FOREIGN PATENT DOCUMENTS

| | | |
|---|---|---|
| WO | 2020049576 A2 | 3/2020 |
| WO | 2022064482 A1 | 3/2022 |
| WO | 2022172274 A1 | 8/2022 |

OTHER PUBLICATIONS

Booker, "Technology Targets Spray Control", WEEDit, Blog, 4P., Mar. 22, 2018.

(Continued)

*Primary Examiner* — Joseph A Greenlund
(74) *Attorney, Agent, or Firm* — Intrinsic Law Corp.

(57) ABSTRACT

A retrofit dual sprayer system comprises an agricultural vehicle having a broadcast tank mounted thereon, the broadcast tank having a first volumetric capacity for holding general-application liquid chemical(s) for preventing undesirable plants from growing in an agricultural field, a selective-spot spray (SSP) tank retrofitly mounted on the agricultural vehicle, the SSP tank having a second volumetric capacity for holding specific liquid chemical(s) for treating one or more target weeds growing in the agricultural field, the second volumetric capacity greater than or equal to about 5% of the first volumetric capacity and less than or equal to about 30% of the first volumetric capacity, a spray boom attached to the agricultural vehicle, the spray boom including broadcast nozzles mounted on the spray boom, the broadcast nozzles fluidly coupled to the broadcast tank, and SSP nozzles retrofitly mounted on the spray boom, the SSP nozzles fluidly coupled to the SSP tank.

13 Claims, 13 Drawing Sheets

(52) U.S. Cl.
CPC .......... *A01M 7/0042* (2013.01); *A01M 7/006* (2013.01); *A01M 7/0085* (2013.01)

(56) References Cited

U.S. PATENT DOCUMENTS

| | | | | |
|---|---|---|---|---|
| 9,148,995 | B2 * | 10/2015 | Hrnicek | A01C 23/008 |
| 10,255,670 | B1 * | 4/2019 | Wu | H04N 7/183 |
| 10,799,897 | B2 * | 10/2020 | Posselius | B05B 12/1418 |
| 11,393,049 | B2 * | 7/2022 | Khait | G06N 3/09 |
| 11,457,621 | B2 * | 10/2022 | Fisher | A01M 7/0042 |
| 11,849,207 | B2 * | 12/2023 | Scheiner | G01B 11/24 |
| 2004/0195356 | A1 * | 10/2004 | Ellsworth | A01M 7/0053 |
| | | | | 239/166 |
| 2012/0237083 | A1 | 9/2012 | Lange et al. | |
| 2017/0006852 | A1 * | 1/2017 | Engelbrecht | A01M 7/0089 |
| 2018/0330166 | A1 * | 11/2018 | Redden | G06V 20/188 |
| 2019/0064363 | A1 * | 2/2019 | Redden | G01N 33/0098 |
| 2019/0124827 | A1 * | 5/2019 | Davis | A01C 23/007 |
| 2019/0239502 | A1 * | 8/2019 | Palomares | G05D 1/0246 |
| 2020/0011019 | A1 * | 1/2020 | Serrat | G06T 1/20 |
| 2020/0045953 | A1 * | 2/2020 | Serrat | A01M 7/0057 |
| 2020/0113171 | A1 * | 4/2020 | Davis | A01M 7/005 |
| 2020/0141079 | A1 * | 5/2020 | Kijlstra | G06T 7/70 |
| 2020/0197968 | A1 * | 6/2020 | Schwalbe | B05B 13/00 |
| 2020/0214281 | A1 * | 7/2020 | Koch | G06F 18/24 |
| 2021/0056338 | A1 * | 2/2021 | Padwick | G06T 7/11 |
| 2022/0092705 | A1 * | 3/2022 | Khait | G06N 3/08 |
| 2022/0201930 | A1 * | 6/2022 | Wonderlich | A01C 23/025 |
| 2023/0039763 | A1 * | 2/2023 | Khait | G06T 7/0002 |
| 2023/0090714 | A1 * | 3/2023 | Long | A01B 76/00 |
| | | | | 701/25 |
| 2023/0119310 | A1 * | 4/2023 | Long | G05D 1/0246 |
| | | | | 701/3 |
| 2023/0124667 | A1 * | 4/2023 | Sibley | A01M 9/0092 |
| | | | | 47/1.7 |
| 2023/0172108 | A1 * | 6/2023 | Long | A01D 41/127 |
| | | | | 56/10.2 R |
| 2023/0276783 | A1 * | 9/2023 | Pleines | A01M 7/0089 |
| | | | | 47/1.7 |
| 2023/0343090 | A1 * | 10/2023 | Khait | G06V 20/188 |
| 2023/0397595 | A1 * | 12/2023 | Gauer | A01B 69/008 |
| 2024/0081315 | A1 * | 3/2024 | Stuber | B05B 12/1418 |
| 2024/0147982 | A1 * | 5/2024 | Tanner | A01M 7/0096 |
| 2024/0190645 | A1 * | 6/2024 | Smith | A01M 7/0085 |
| 2024/0245044 | A1 * | 7/2024 | Khait | A01M 7/006 |

OTHER PUBLICATIONS

Klein et al., "Nozzles—Selection and Sizing", Cooperative Extension, Institute of Agriculture and Natural Resources, University of Nebraska—Lincoln, EC141, p. 1-10, 2011.
Wolf, "Optical Spot Spraying and AI Scouting", Sprayers 101, 12 P., Feb. 8, 2019.
International Search Report for PCT Application No. PCT/IL2021/051133, dated Dec. 22, 2021.

* cited by examiner

SYSTEM FOR DUAL LINE SPRAYING OF AN AGRICULTURAL FIELD

CROSS-REFERENCE TO RELATED APPLICATIONS

This application claims priority to U.S. Provisional Application No. 63/481,241 titled "System for Dual Line Spraying of an Agricultural Field," filed on Jan. 24, 2023, which is hereby incorporated by reference.

TECHNICAL FIELD

This application relates generally to a system for spraying an agricultural field.

BACKGROUND

Agricultural spray systems are often sold as single-tank broadcast spray systems. These systems apply a general herbicide across all areas of an agricultural field to prevent weed growth. While such systems are useful, they do not target specific weeds that are already growing.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to a retrofit dual sprayer system comprising an agricultural vehicle having a broadcast tank mounted thereon, the broadcast tank having a first volumetric capacity for holding one or more general-application liquid chemicals for preventing undesirable plants from growing in an agricultural field; a selective-spot spray (SSP) tank retrofitly mounted on the agricultural vehicle, the SSP tank having a second volumetric capacity for holding one or more specific liquid chemicals for treating one or more target weeds growing in the agricultural field, the second volumetric capacity greater than or equal to about 5% of the first volumetric capacity and less than or equal to about 30% of the first volumetric capacity; a spray boom attached to the agricultural vehicle, the spray boom including a plurality of broadcast nozzles mounted on the spray boom, the broadcast nozzles fluidly coupled to the broadcast tank; and a plurality of SSP nozzles retrofitly mounted on the spray boom, the SSP nozzles fluidly coupled to the SSP tank.

In one or more embodiments, the system further comprises a plurality of image sensors retrofitly mounted on the spray boom and configured to capture images of the agricultural field in a direction of travel of the agricultural vehicle, each image sensor having a field of view that is aligned with and corresponds with one or more of the SSP nozzles; one or more retrofit computers in electrical communication with the image sensors, the retrofit computer(s)

configured to receive captured images and detect the target weed(s) in the captured images using a trained machine learning (ML) model, the trained ML model having been trained with first and second training images of agricultural fields, the first training images including the target weed(s), the second training images not including the target weed(s); and a plurality of retrofit electromechanically actuated valves, each retrofit electromechanically actuated valve fluidly coupled to a respective SSP nozzle, the retrofit computer(s) in electrical communication with the retrofit electromechanically actuated valves to open each retrofit electromechanically actuated valve in response to a detection of the target weed(s) in the captured images.

In one or more embodiments, the broadcast tank includes a first filling line, the SSP tank includes a second filling line, and an internal diameter of the second filling line is smaller than an internal diameter of the first filling line. In one or more embodiments, an agitation line is fluidly coupled to the SSP tank to agitate the specific liquid chemical(s) in the SSP tank. In one or more embodiments, a recirculation line is fluidly coupled to the SSP tank and to one or more SSP fluid lines on the spray boom, the SSP line(s) fluidly coupled to the SSP nozzles.

In one or more embodiments, a first pump is fluidly coupled to the broadcast tank, a second pump is fluidly coupled to the SSP tank, and the first and second pumps are fluidly coupled to a shared hydraulic tank and/or a shared hydraulic pump. In one or more embodiments, the agricultural vehicle includes a plurality of wheels, and a center of gravity of the system remains between the wheels when the system includes the SSP tank compared to when the SSP tank is removed.

Another aspect of the invention is directed to a retrofit dual sprayer system comprising an agricultural vehicle having a broadcast tank mounted thereon, the broadcast tank having a first volumetric capacity for holding one or more general-application liquid chemicals for preventing undesirable plants from growing in an agricultural field; a plurality of selective-spot spray (SSP) tanks retrofitly mounted on the agricultural vehicle, the SSP tanks having a combined volumetric capacity for holding one or more specific liquid chemicals for treating one or more target weeds growing in the agricultural field, the combined volumetric capacity greater than or equal to about 5% of the first volumetric capacity and less than or equal to about 30% of the first volumetric capacity; a spray boom attached to the agricultural vehicle, the spray boom including a plurality of broadcast nozzles mounted on the spray boom, the broadcast nozzles fluidly coupled to the broadcast tank; and a plurality of SSP nozzles retrofitly mounted on the spray boom, the SSP nozzles fluidly coupled to the SSP tanks.

Another aspect of the invention is directed to a retrofit dual sprayer system comprising an agricultural vehicle having a broadcast tank mounted thereon, the broadcast tank having a first volumetric capacity for holding one or more general-application liquid chemicals for preventing undesirable plants from growing in an agricultural field; a selective-spot spray (SSP) tank retrofitly mounted on the agricultural vehicle, the SSP tank having a second volumetric capacity for holding a liquid chemical for treating a target agricultural crop growing in crop rows in an agricultural field, the second volumetric capacity greater than or equal to about 5% of the first volumetric capacity and less than or equal to about 30% of the first volumetric capacity; a spray boom attached to the agricultural vehicle, the spray boom including a plurality of broadcast nozzles mounted on the spray boom, the broadcast nozzles fluidly coupled to the broadcast tank; a plurality of SSP nozzles retrofitly mounted on the spray boom, the SSP nozzles fluidly coupled to the SSP tank; one or more retrofit computers in electrical communication with the SSP nozzles; and a plurality of retrofit electromechanically actuated valves, each retrofit electromechanically actuated valve fluidly coupled to a respective SSP nozzle, the computer(s) in electrical communication with the retrofit electromechanically actuated valves and configured to open the retrofit electromechanically actuated valves for only the SSP nozzles that are aligned with respective crop rows.

In one or more embodiments, the system further comprises a plurality of image sensors retrofitly mounted on the spray boom and configured to capture images of the agricultural field in a direction of travel of the agricultural vehicle, each image sensor having a field of view that is aligned with and corresponds with one or more of the SSP nozzles, wherein the retrofit computer(s) is/are configured to receive captured images from the image sensors and detect the target agricultural crop in the captured images using a trained machine learning (ML) model, the trained ML model having been trained with first and second training images of agricultural fields, the first training images including the target agricultural crop, the second training images not including the target agricultural crop, and the retrofit computer(s) is/are configured to automatically open the retrofit electromechanically actuated valves for only the SSP nozzles that are aligned with respective crop rows using the captured images and the trained ML model.

In one or more embodiments, the liquid chemical comprises a fertilizer. In one or more embodiments, the liquid chemical comprises an herbicide.

In one or more embodiments, the computer(s) is/are configured to open the retrofit electromechanically actuated valves for every third SSP nozzle.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

A retrofit dual sprayer system includes one or more selective-spot spray (SSP) tanks that is/are retrofitly mounted on a broadcast spray system. The broadcast spray system includes an agricultural vehicle having a broadcast tank mounted thereon. Fluid lines couple the broadcast tank to broadcast nozzles on a spray boom attached to the agricultural vehicle. The SSP tank(s) are fluidly coupled to SSP nozzles (e.g., via a second nozzle line) that are retrofitly mounted on the spray boom. The broadcast tank and the SSP tank(s) can be fluidly coupled to the same pump or to different pumps.

The SSP tank(s) have a combined or total volumetric capacity that is lower than the volumetric capacity of the broadcast tank. In one example, the combined volumetric capacity of the SSP tank(s) is about 5% to about 30% the volumetric capacity of the broadcast tank. The ratio or relationship between the combined volumetric capacity of the SSP tank(s) and the volumetric capacity of the broadcast tank can be selected such that the liquid chemicals in the SSP tank(s) and in the broadcast tank are applied at approximately the same relative rate such that the SSP tank(s) and the broadcast tank are emptied at approximately the same time, which can provide efficiencies for refilling the SSP tank(s) and the broadcast tank at the same time.

Figure 1:
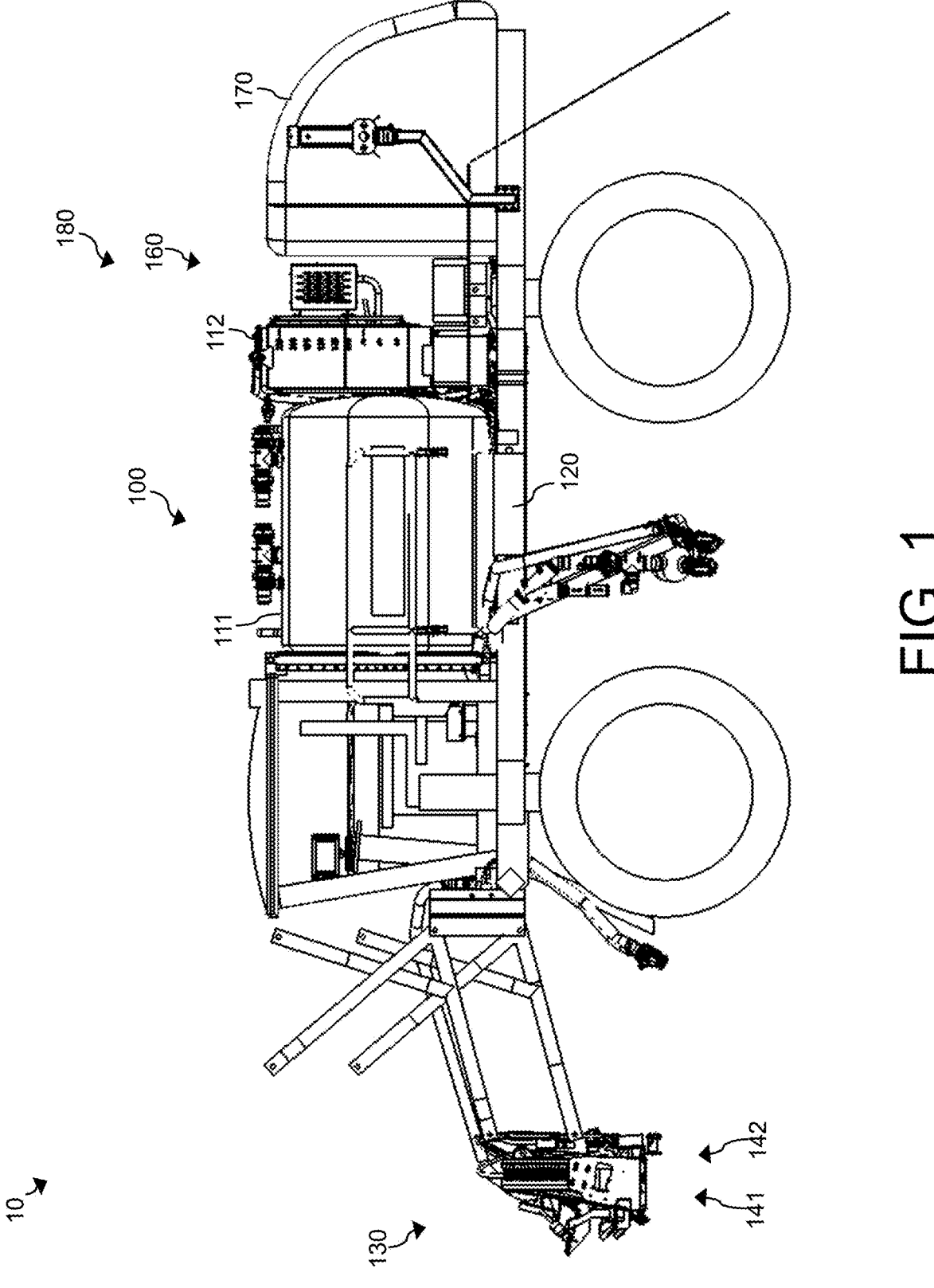
FIG. 1 is a side view of a retrofit dual line sprayer system according to an embodiment.

FIG. 1 is a side view of a retrofit dual sprayer system 10 according to an embodiment. The system 10 includes an agricultural vehicle 100, a broadcast tank 111, an SSP tank 112, a rinse tank 120, and a spray boom 130. The spray boom 130 is illustrated as partially exploded.

The broadcast tank 111 is mounted on the agricultural vehicle 100 and can be an original-equipment manufacturer (OEM) tank and/or a primary tank for the agricultural vehicle 100. The agricultural vehicle 100, the broadcast tank 111, the rinse tank 120, and/or corresponding fluid lines can comprise an OEM single-line broadcast spray system 180.

The broadcast tank 111 is configured to hold one or more general-application liquid chemicals (e.g., herbicides) to be sprayed broadly onto an agricultural field using the spray boom 130, which is attached (e.g., releasably attached) to the agricultural vehicle 100. The broadcast liquid chemicals are configured to prevent weeds and/or other undesirable plants from growing. One or more first fluid lines 141 fluidly couple the broadcast tank 111 to broadcast nozzles on the spray boom 130.

The SSP tank 112 is mounted on the agricultural vehicle 100 and can be an aftermarket tank that is retrofit onto the agricultural vehicle 100. The SSP tank 112 is configured to hold one or more target-application or specific chemical(s) (e.g., herbicide(s) that is/are designed to target one or more weeds growing in the agricultural field. One or more second fluid lines 142 fluidly couple the SSP tank 112 to SSP nozzles on the spray boom 130. The specific chemical(s) in the SSP tank 112 are selectively sprayed using the SSP nozzles in response to imaging of the agricultural field and analysis/detection by one or more trained machine learning models. Valves or solenoids coupled to the SSP nozzles can be opened and closed to selectively spray the detected weeds.

The spray boom 130, the first fluid line(s) 141, the rinse tank 120, the broadcast nozzles, and corresponding valves, sensors, and pump can be OEM components that are sold with and/or provided with the agricultural vehicle 100, including the broadcast tank 111, as the single-line sprayer system 180. The second fluid line(s) 142, the SSP nozzles, and corresponding valves/solenoids, sensors, and pump can be aftermarket components that are retrofit onto the spray boom 130 and agricultural vehicle 100.

The rinse tank 120 is fluidly coupled to the broadcast tank 111 and to the SSP tank 112. Water and/or another liquid stored in the rinse tank 120 can be used to rinse the broadcast tank 111 and the SSP tank 112 after each tank 111, 112 is emptied. The rinse tank 120 can be an OEM component of the agricultural vehicle 100 (e.g., of the single-line sprayer system 180). The relatively small volume of the SSP tank 112 allows the same rinse tank to be shared with the broadcast tank 111. For example, the small SSP tank 112 does not require a significant volume of water or sprinklers or other active components in the rinsing systems.

The agricultural vehicle 100 can be a single-tank sprayer system that includes the broadcast tank 111 as an OEM component and the SSP tank 112 as an aftermarket component. Examples of includes single-tank sprayer systems include Hagie STS (single-tank system) sprayer (e.g., the STS 10, the STS12, the STS16, or the STS 20), a John Deere sprayer (e.g., 408R, 410R, 412R, R4045, R4038, R4044, R4030, 612R, or 614R), a Case IH sprayer (e.g., 3250, 4350, 4450, 4440, 4430, 3340, or 3240), a Miller Nitro sprayer (e.g., 7310, 7410, or 7370), a Rogator sprayer (e.g., RG900C, RG1100C, or RG1300C), a Fendt sprayer (e.g., RG934, RG934H, RG937, or RG937H), or another single-tank sprayer system.

The selective application of the specific chemical(s) stored in the SSP tank 112 allows the volumetric capacity of the SSP tank 112 to be smaller than the volumetric capacity of the broadcast tank 111. In one example, the volumetric capacity of the broadcast tank 111 can be at least about 3 times greater than the volumetric capacity of the SSP tank 112. For example, the volumetric capacity of the broadcast tank 111 can be about 3 to about 20 times, including about 5 times, about 10 times, about 15 times, and any value or range between any two of the foregoing values, greater than the volumetric capacity of the SSP tank 112. Conversely, the volumetric capacity of the SSP tank 112 can be less than or equal to about 30% the volumetric capacity of the broadcast tank 111. For example, the volumetric capacity of the SSP tank 112 can be about 5% to about 30%, including about 10%, about 15%, about 20%, about 25%, and any value or range between any two of the foregoing values, lower than the volumetric capacity of the broadcast tank 111.

The relative sizes (volumetric capacities) of the broadcast tank 111 and the SSP tank 112 can be configured such that, on average, each tank 111, 112 will be emptied (from a respective full tank) at approximately the same time. For example, the respective chemicals stored in each tank 111, 112 can be used, on average, at the same relative volumetric rate compared to the respective size of the tank 111, 112. This allows the refilling of tanks 111, 112 to be synchronized which can improve efficiency. In addition, the retrofit dual sprayer system 10 preserves the volumetric capacity of the broadcast tank 111, allowing for equal field coverage during broadcast spraying as in the OEM single-line broadcast spray system 180.

The smaller size of the SSP tank 112, compared to the broadcast tank 111, can allow the SSP tank 112 to fit into an available space 160 on the agricultural vehicle 100. For example, the SSP tank 112 can be located between the broadcast tank 111 and an engine 170 of the agricultural vehicle 100. Other locations can be used for the SSP tank 112 and such locations can vary by the model of the agricultural vehicle 100 (e.g., of the single-tank sprayer system).

The engine 170 can be replaced with a motor when the agricultural vehicle 100 is electric or can include both an engine and a motor when the agricultural vehicle 100 is a hybrid. In any case, the agricultural vehicle 100 includes a mechanical drive system that powers the agricultural vehicle 100 and the wheels.

Figure 2:
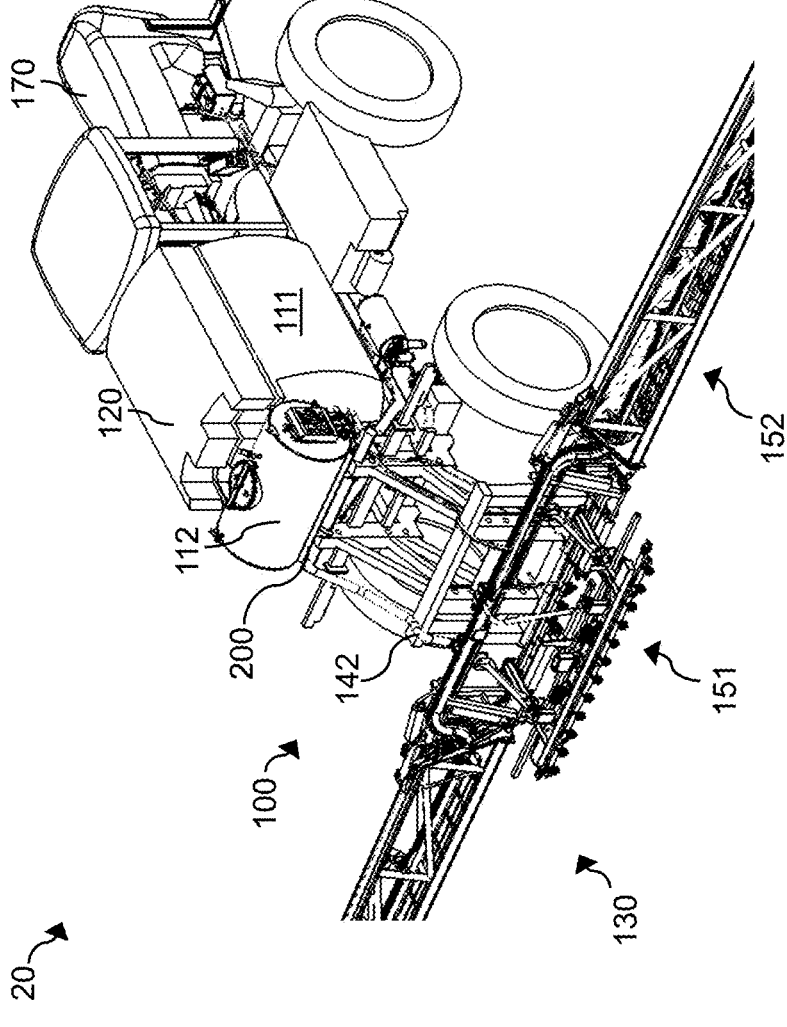
FIG. 2 is an isometric view of a retrofit dual line sprayer system according to another embodiment.

FIG. 2 is an isometric view of a retrofit dual sprayer system 20 according to another embodiment. System 20 is the same as system 10 except for the configuration/location of the broadcast tank 111, the SSP tank 112, and the rinse tank 120. In system 20, the rinse tank 120 is located on top of the broadcast tank 111. The SSP tank 112 is mounted in front of the broadcast tank 111 and of the rinse tank 120 and on a frame 200 of the agricultural vehicle 100.

In some embodiments, the configuration/location of the broadcast tank 111, the rinse tank 120, the engine 170, and/or other components of the agricultural vehicle 100 make it difficult or impossible (e.g., at least without significant modification) to add a single SSP tank with sufficient volume such that, on average, the broadcast tank 111 and the single SSP would be emptied (from a respective full tank) at approximately the same time. To address this issue, additional SSP tanks can be added to the agricultural vehicle 100.

FIG. 2 also illustrates the broadcast nozzles 151 and the SSP nozzles 152.

Figure 3A:
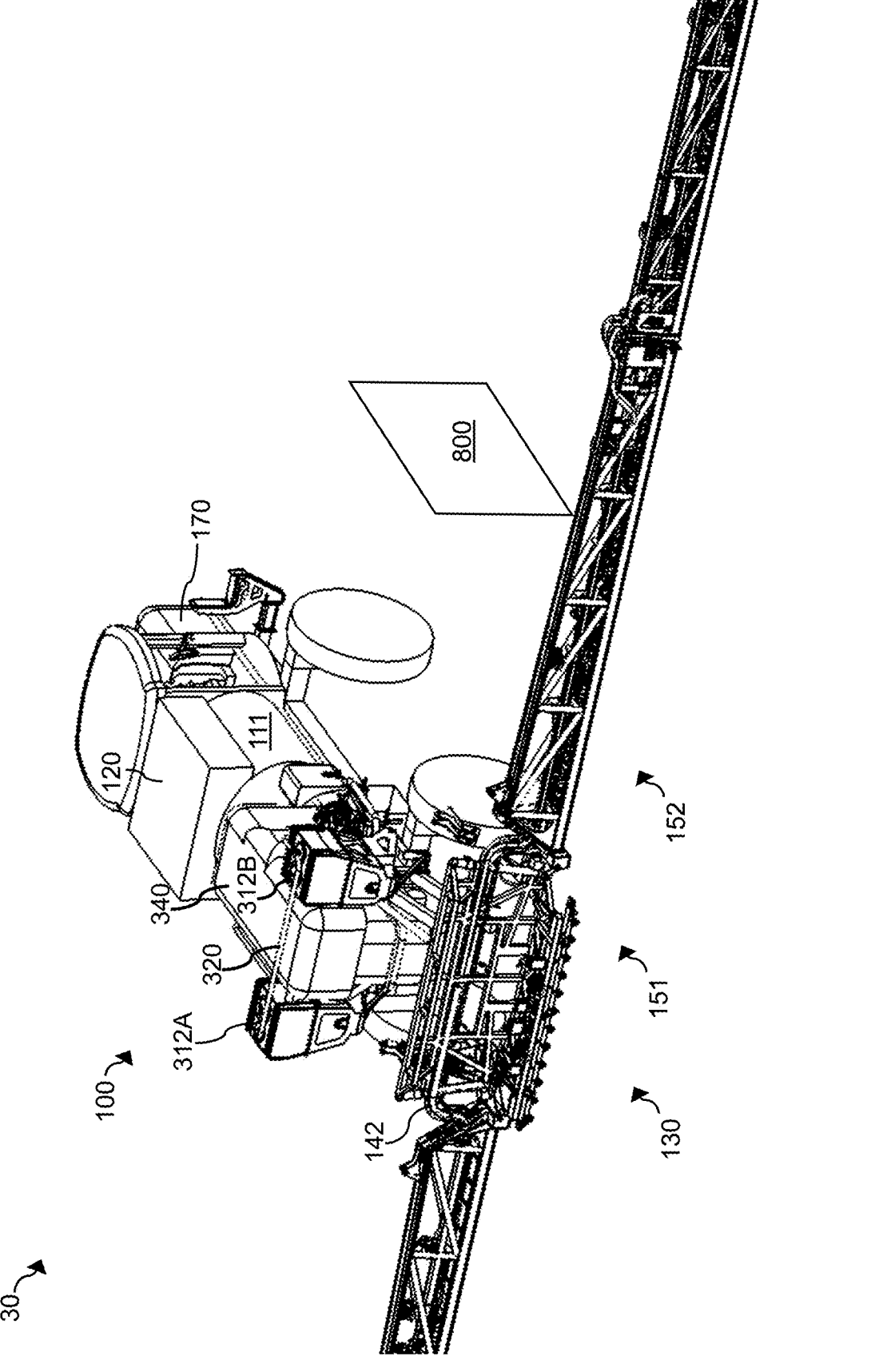
FIG. 3A is an isometric view of a retrofit dual line sprayer system according to another embodiment.

FIG. 3A is an isometric view of a retrofit dual sprayer system 30 according to another embodiment. System 30 is the same as system 20 except that system 30 includes multiple SSP tanks. For example, system 30 includes a first SSP tank 312A and a second SSP tank 312B. Additional SSP tanks can be included. The first and second SSP tanks 312A, 312B are fluidly coupled to each other through a common fluid line 320. A common rinse line 322 can be fluidly coupled to the first and second SSP tanks 312A, 312B. The combined volumetric capacity of the first and second SSP tanks 312A, 312B is the same as the volumetric capacity of the SSP tank 112 (FIGS. 1, 2). The first and second SSP tanks 312A, 312B can have the same volumetric capacity as one another or they have different volumetric capacities.

The first and second SSP tanks 312A, 312B are attached between the motor 340 for the agricultural vehicle 100. One or both SSP tanks 312A, 312B can be located in different locations in other embodiments.

Figure 3B:
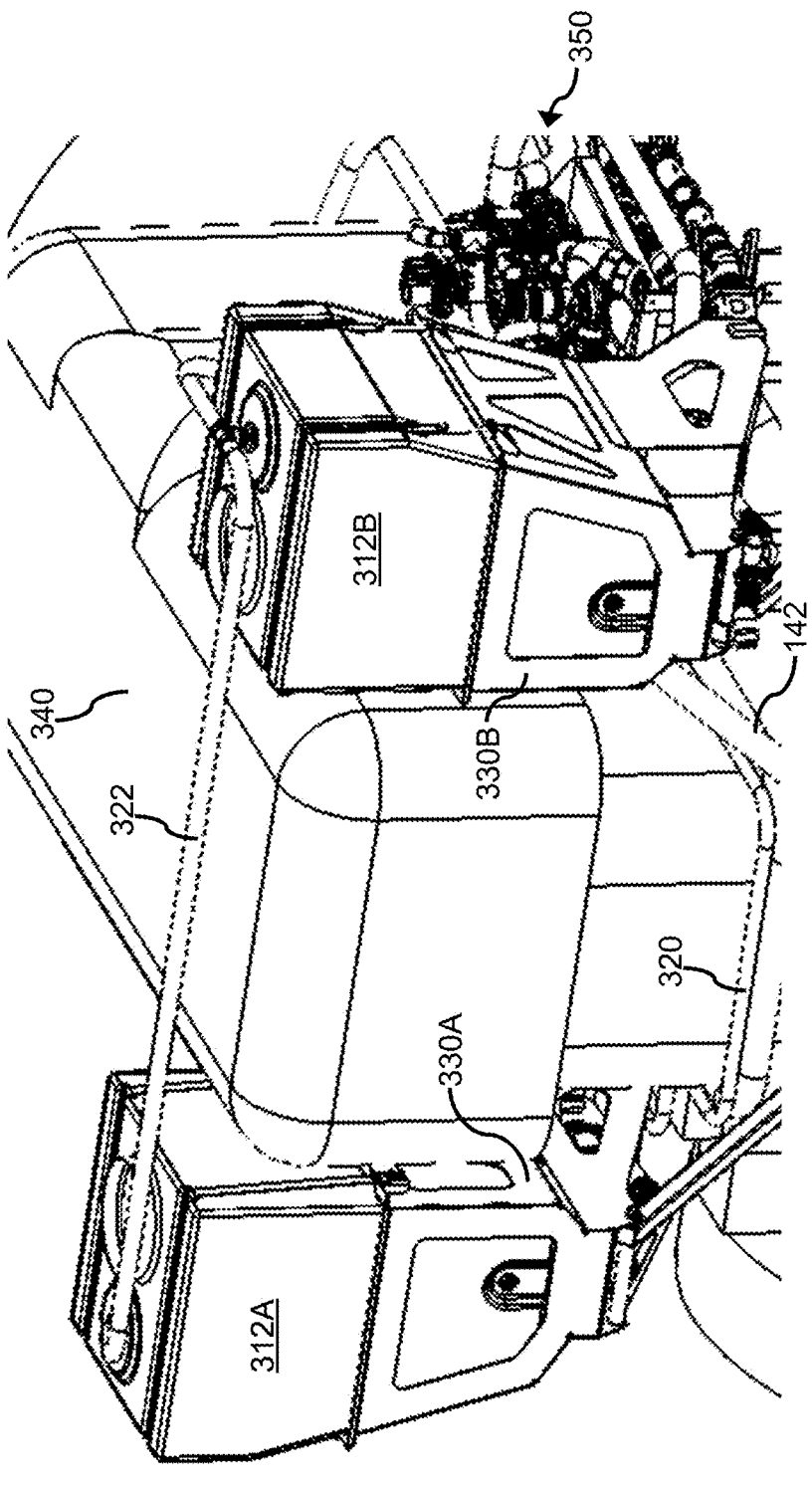
FIG. 3B is a detailed isometric view of the first and second SSP (Selective Spot Spraying) tanks illustrated in FIG. 3A.

FIG. 3B is a detailed isometric view of the first and second SSP tanks 312A, 312B. The second fluid line(s) 142 are fluidly coupled to a common fluid line 320 to provide target-application or specific chemical(s) for the SSP nozzles 152. One or more pumps 350 are fluidly coupled to the first and second SSP tanks 312A, 312B and/or to the second fluid line(s) 142.

First and second frames 330A, 330B are configured to receive and support the respective SSP tanks 312A, 312B. The first and second frames 330A, 330B can be attached to the agricultural vehicle 100, for example to the motor 340 (e.g., to the motor housing).

Figure 3C:
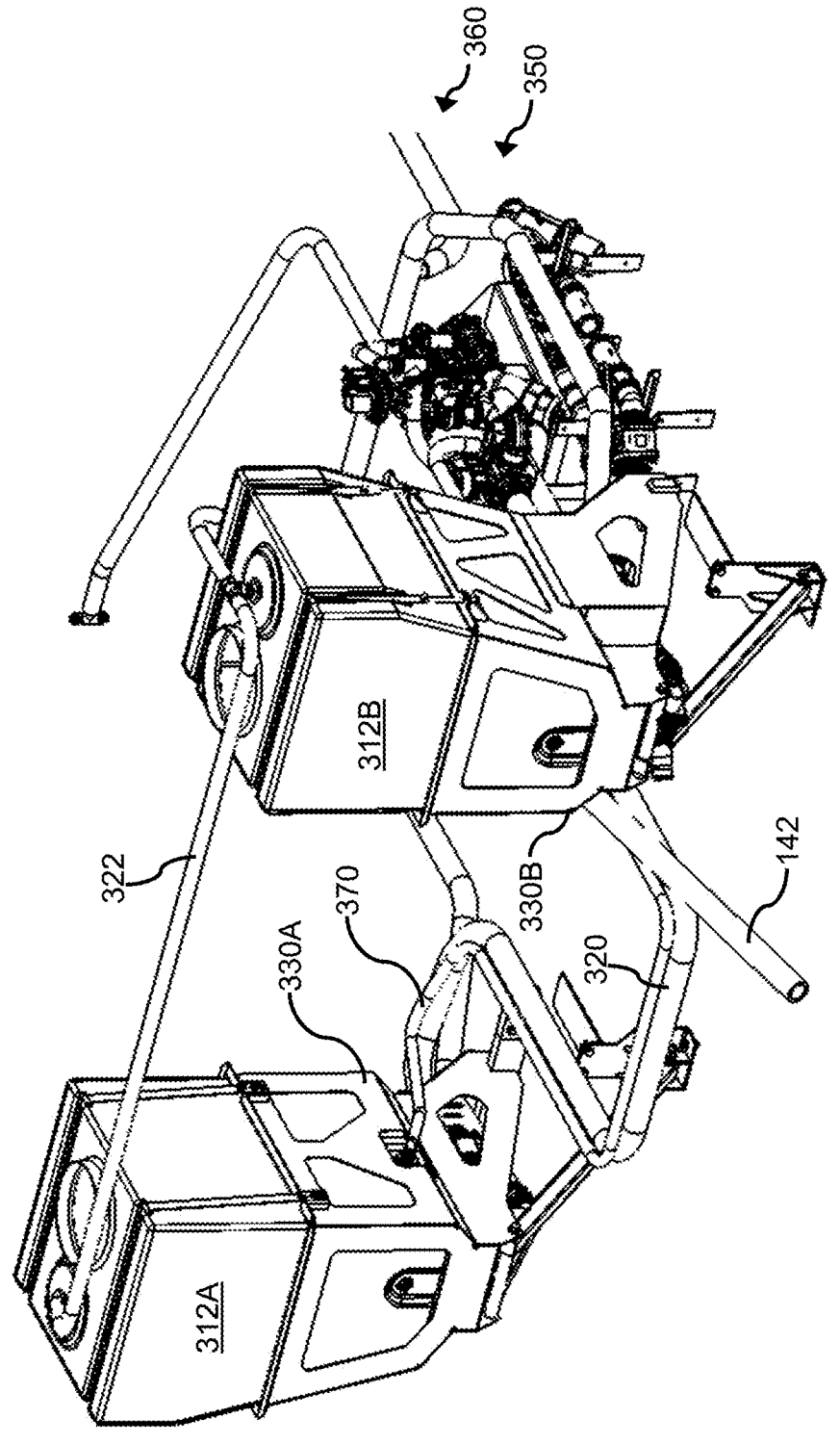
FIG. 3C is an isolated isometric view of the first and second SSP tanks illustrated in FIGS. 3A and 3B.

FIG. 3C is an isolated isometric view of the first and second SSP tanks 312A, 312B according to an embodiment. The second fluid line(s) 142 are fluidly coupled to a common fluid line 320 to provide target-application or specific chemical(s) for the SSP nozzles 152. One or more fill lines 360 are fluidly coupled to the first and second SSP tanks 312A, 312B to fill each tank with target-application or specific chemical(s). The fill line(s) 360 can be fluidly coupled to the pump(s) 350. A recirculation line 370 can extend be fluidly coupled to the second fluid line(s) 142 at the spray boom to recirculate fluid back to the first and/or second SSP tanks 312A, 312B.

Figure 4:
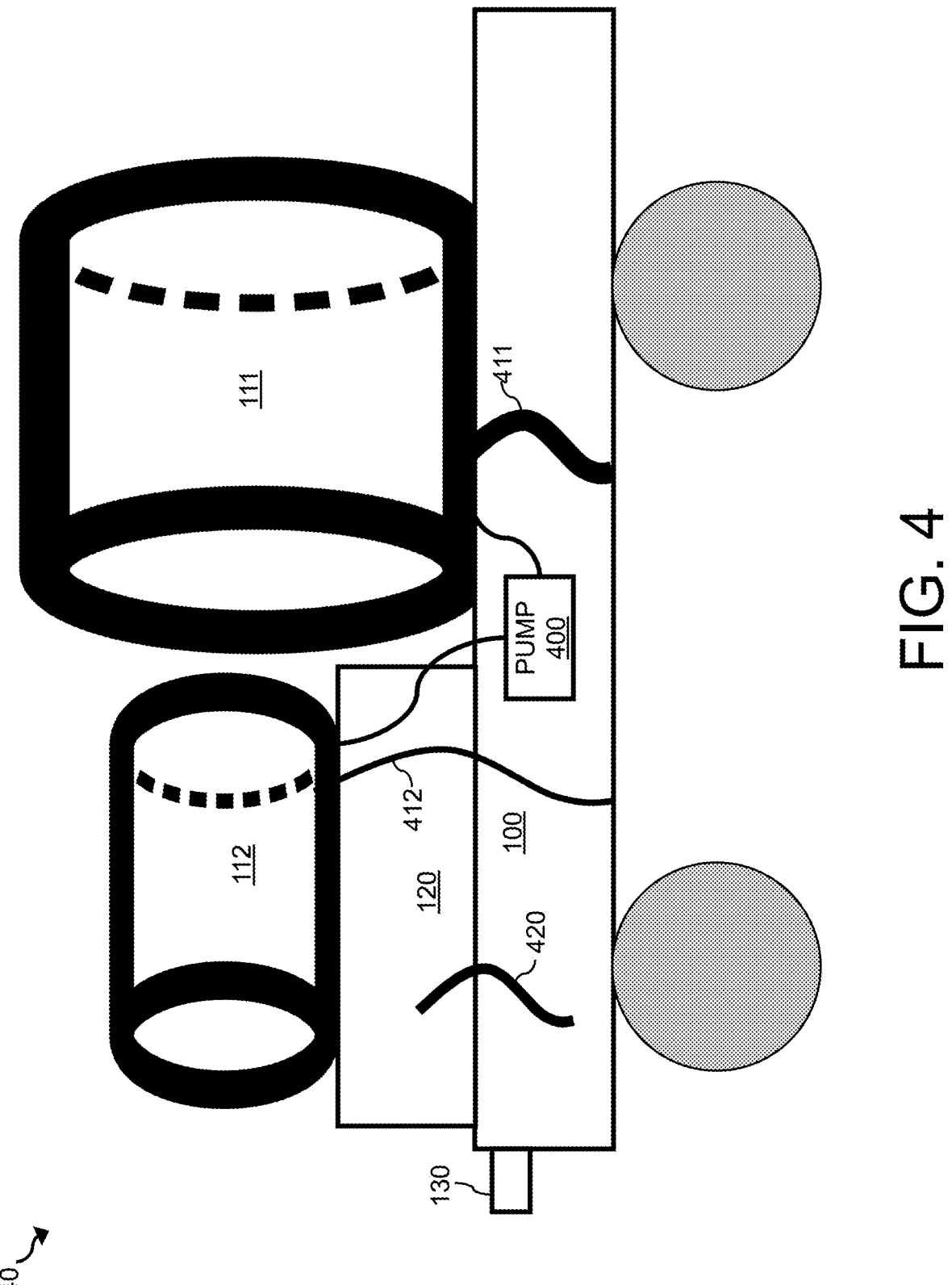
FIG. 4 is a simplified side view of a retrofit dual line sprayer system according to another embodiment.

FIG. 4 is a simplified side view of a retrofit dual sprayer system 40 according to another embodiment. System 40 can be the same as system 10 and/or system 20. The side view illustrates that each tank 111, 112, 120 includes a respective filling line 411, 412, 420. The filling lines 411, 412, 420 can be used to add (or remove) respective liquid materials to each tank 111, 112, 120. For example, filling line 411 can be used to add and/or remove general-application liquid chemicals to/from the broadcast tank 111. Filling line 412 can be used to add and/or remove target-application or specific liquid chemical(s) to/from the SSP tank 112. Filling line 420 can be used to add and/or remove water and/or another liquid to/from the rinse tank 120.

The internal diameter of filling line 411 can be smaller than the internal diameter of filling line 412. The smaller internal diameter of filling line 411, compared to the internal diameter of filling line 412, restricts fluid flow into the SSP tank 112 while the larger internal diameter of filling line 412, compared to the internal diameter of filling line 411, promotes fluid flow into the broadcast tank 111. The internal diameters of filling lines 411, 412 can be selected and/or configured such that the SSP tank 112 and the broadcast tank 111 are filled at about the same relative rate. For example, assuming the same applied fluid pressure, it can take about the same amount of time to fill the SSP tank 112 as to fill the broadcast tank 111. When the SSP tank 112 and the broadcast tank 111 are filled simultaneously, the SSP tank 112 and the broadcast tank 111 will complete filling at about the same time.

Filling line 411 can have an internal diameter of about 1 inch to about 2 inches including about 2.25 inches, about 2.5 inches, about 2.75 inches, and any value or range between any two of the foregoing values. Filling line 412 can have an internal diameter of about 2.5 inches to about 4 inches including about 3 inches, about 3.5 inches, and any value or range between any two of the foregoing values. In some embodiments, the internal diameter of filling line 411 can be about 50% to about 66^ the internal diameter of filling line 412. Likewise, the internal diameter of filling line 412 can be about 1.5× to about 2× the internal diameter of filling line 411.

In some embodiments, the filling lines 411, 412 and/or the broadcast tank 111 and the SSP tank 112 are fluidly coupled to a common pump 400. An advantage of having a common pump is that the broadcast tank 111 and the SSP tank 112 would need to be filled separately (e.g., serially) and the visual difference in the internal diameters of the filling lines 411, 412 can reduce the likelihood that the incorrect chemicals are filled into one of the tanks 111, 112. The lower volumetric capacity of the SSP tank 112 allows both tanks 111, 112 to be filled using the common pump 400 without adding significant time compared to filling only the broadcast tank 111 for the single-line sprayer system 180. Common pump 400 can be the same as pump(s) 350.

Figure 5:
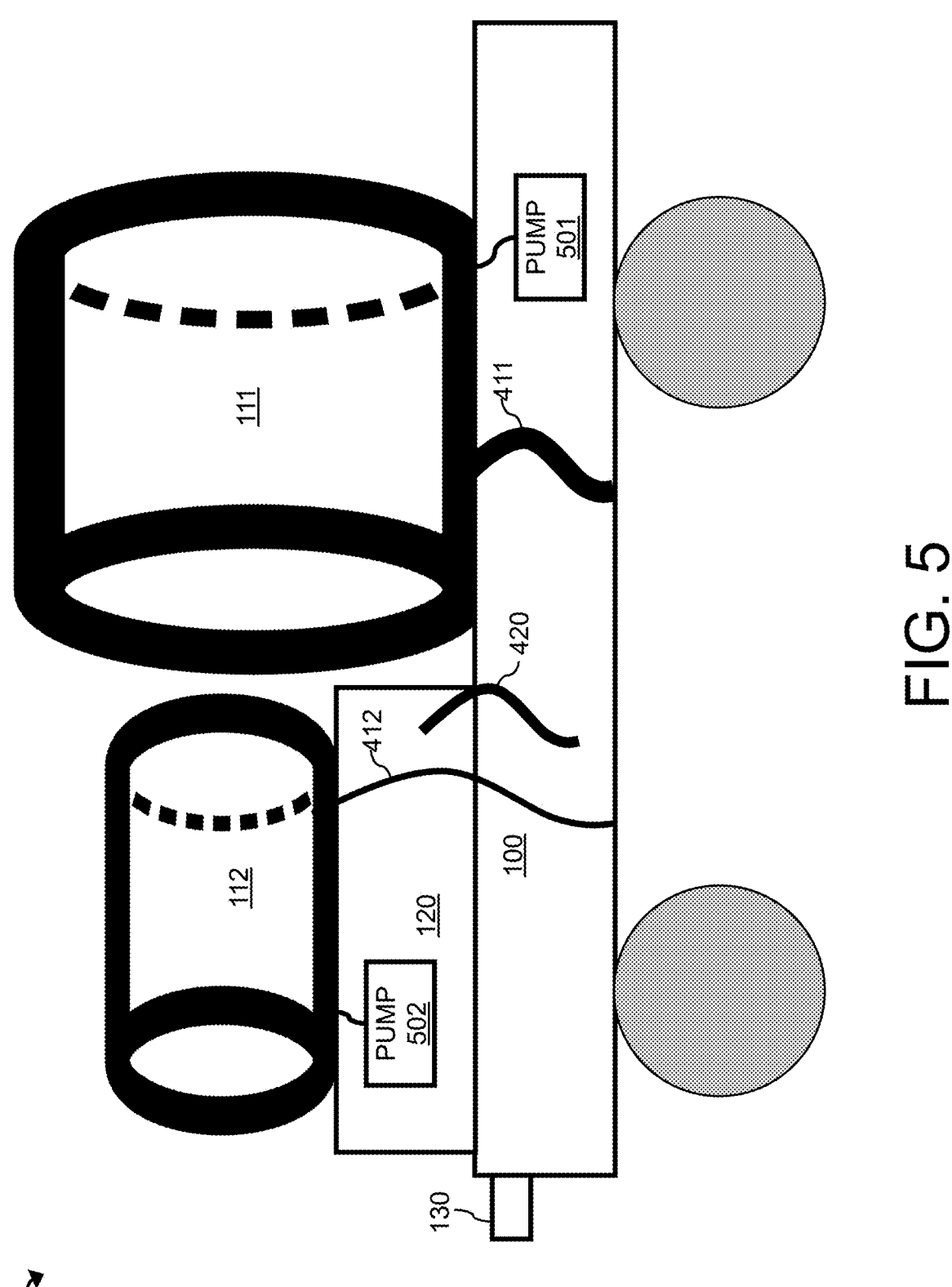
FIG. 5 is a simplified side view of a retrofit dual line sprayer system according to another embodiment.

FIG. 5 which illustrates a retrofit dual sprayer system 50 according to another embodiment. System 50 is the same as system 40 except that in system 50 the filling line 411 and/or the broadcast tank 111 are fluidly coupled to a first pump 501 and the filling line 412 and/or the SSP tank 112 are fluidly coupled to a second pump 502. An advantage of having different pumps is that the tanks 411, 412 can be filled simultaneously which reduces filling time.

The rinse tank 120 can share one of the pumps 400, 501, 502 or can have a separate pump.

Figure 6A:
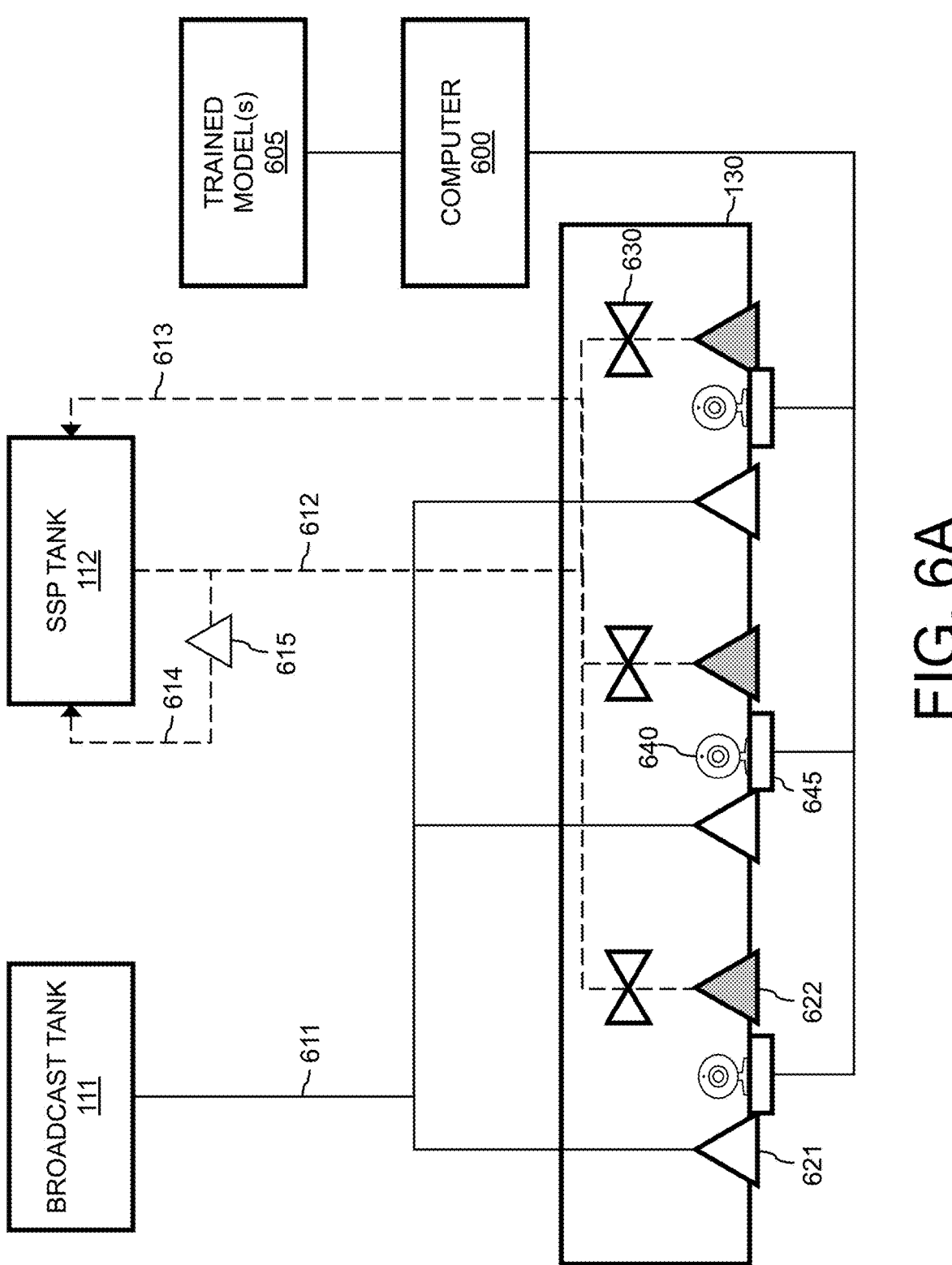
FIG. 6A is a block diagram of fluid and electrical circuits for the broadcast tank and the SSP tank according to an embodiment.

FIG. 6A is a block diagram of fluid and electrical circuits for the broadcast tank 111 and the SSP tank 112 according to an embodiment. One or more fluid lines 611 fluidly couple the broadcast tank 111 to a plurality of broadcast nozzles 621 on the spray boom 130. One or more fluid lines 612 fluidly couple the SSP tank 112 to a plurality of SSP nozzles 622 on the spray boom 130. Electromechanically actuated valves 630 are located on the fluid line(s) 612 between each SSP nozzle 622 and the SSP tank 112.

An optional recirculation line 613 can be fluidly coupled to fluid line(s) 612 and the SSP tank 112 to recirculate fluid back to the SSP tank 112 and to maintain freshly mixed/agitated liquid chemicals in the fluid lines 612. The recirculation line 613 preferably extends to the spray boom 130 such that the recirculated fluid passes through the spray boom 130 and the associated fluid line(s) 612 to form a fluid loop. In addition, the recirculation line 613 can be used to empty the fluid lines 612 when the dual sprayer system is not in use, such as at the end of the day.

An optional agitation line 614 can be fluidly coupled to fluid line(s) 612 and the SSP tank 112 to mix and/or agitate the liquid chemicals in the SSP tank 112. A rocker switch 615 can be fluidly coupled to the agitation line 614 to control the bypass flow back to the SSP tank 112 for mixing/agitation. The relatively small volume of the SSP tank 112 allows an agitation line to be used while the relatively large volume of the broadcast tank 111 may include additional mixing components.

The state of each valve 630 is controlled by one or more retrofit computers or controllers 600 which is/are electrically coupled to each valve 630. Additional computers and/or controllers can be provided. The computer(s)/controller(s) 600 selectively opens and closes each valve 630 when weeds are detected using images of the agricultural field that are obtained by cameras 640 and/or other image sensors mounted on the spray boom 130. Lights 645 such as light-emitting diodes (LEDs) can be used provide light for the agricultural field. The cameras 640 and lights 645 are in electrical communication with the computer(s)/controller(s) 600 to detect weeds in the images using one or more trained machine learning models 605. The computer(s)/controller(s) 600, the trained machine learning model(s) 605, the valves 630, and the cameras 640 and/or other image sensors are aftermarket components that are retrofit onto the spray boom 130. The field of view of each camera 640 and/or other image sensor(s) is aligned with and corresponds to the position of one or more SSP nozzle 622.

Figure 8:
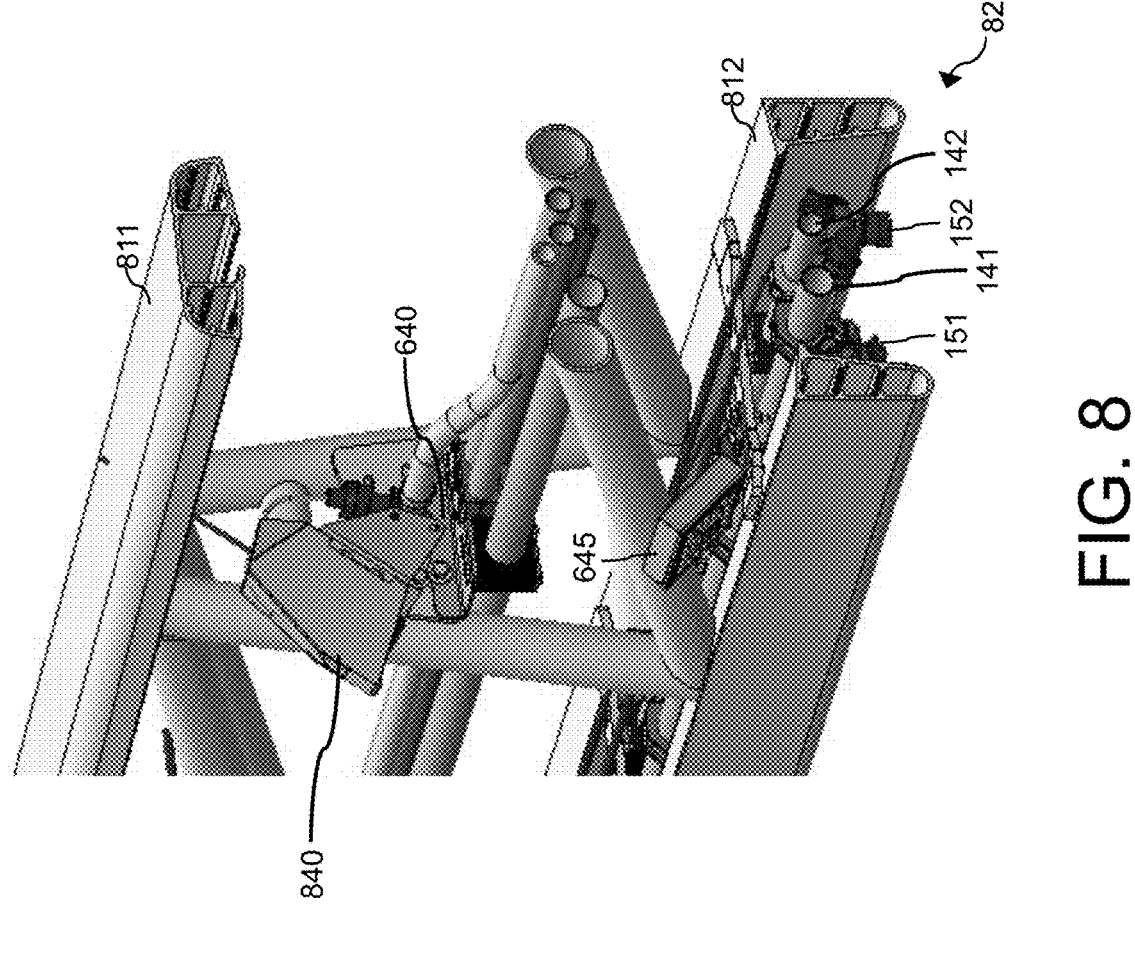
FIG. 8 is a cross section of the spray boom illustrated in FIG. 3A.

The fluid circuits for the broadcast tank 111 and the SSP tank 112 can include additional components, such as pumps, filters, sensors, and/or other components. In some embodiments, the hydraulics can be shared for the broadcast tank 111 and the SSP tank 112, for example as illustrated in FIG. 8.

Figure 6B:
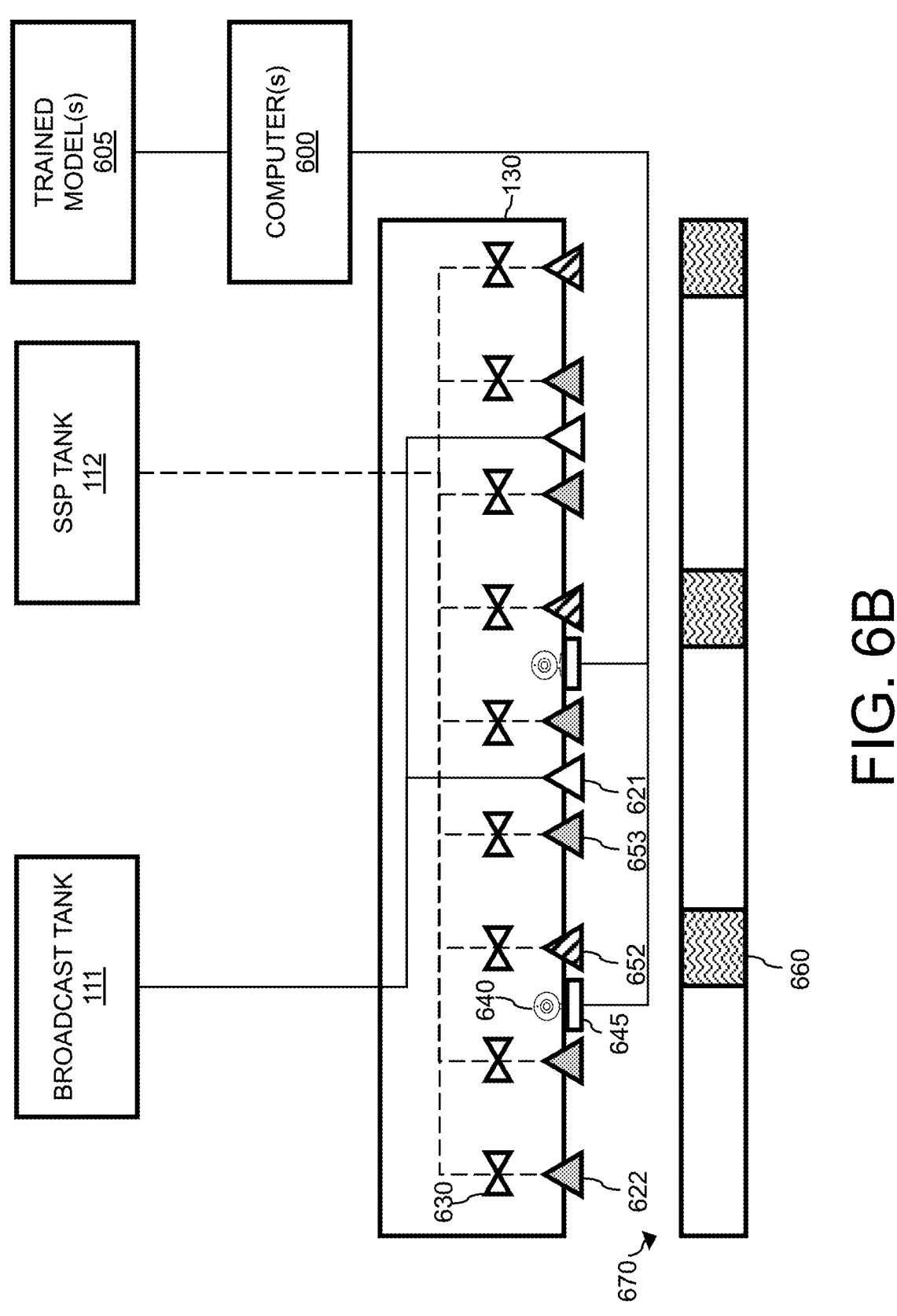
FIG. 6B is a block diagram of fluid and electrical circuits for the broadcast tank and the SSP tank according to another embodiment.

FIG. 6B is a block diagram of fluid and electrical circuits for the broadcast tank 111 and the SSP tank 112 according to another embodiment. FIG. 6B is the same as FIG. 6A except that in FIG. 6B only a subset of the SSP nozzles 622 are activated. The activated SSP nozzles 652 are aligned with the crop rows 660 of agricultural crops in the agricultural field 670. The inactivated SSP nozzles 653 are aligned with the space between the crop rows 660.

The cop rows 660 are typically about 10 inches wide and the space between neighboring crop rows 660 is typically about 20 inches wide. For example, the most common row spacing is off-center 30 inches in corn and soybeans. The SSP nozzles 621 on the spray boom 130 can have a 10 inch off-center nozzle spacing such that every third SSP nozzle 621 is an activated SSP nozzle 652 and the two SSP nozzles 621 between neighboring activated SSP nozzles 652 are inactivated SSP nozzles 653. In one example, starting with the second nozzle, we open every third nozzle (e.g., 2, 5, 8, 11 . . . ) to spray on the canopy. In this configuration, only a third of the SSP nozzles 621 are activated which provides a corresponding two-thirds reduction in the volume of chemicals that needs to be stored in the SSP tank 112. The reduction in the volume of chemicals stored in the SSP tank 112 decreases the cost (e.g., by two thirds) of applying the chemicals to the agricultural field 670 and eliminates waste.

The computer(s)/controller(s) 600 can activate (or deactivate) the SSP nozzles 621 by controlling the state of the respective valves 630. The selection of the SSP nozzles 621 to be activated be controlled manually (e.g., based on user input) or automatically. Automatic control of the valves 630 can be performed using images acquired by the cameras 640 and the detection of crops using the trained model(s) 605. The train model(s) 605 can be trained using first images of the target agricultural crop and/or of target weeds and second images that do not include the target agricultural crop or the target weeds.

The SSP tank 112 can hold herbicides (e.g., chemical(s) specific to a target growth), fungicides, insecticides, fertilizers (e.g., foliar fertilizers), nitrogen-containing compounds, and/or other chemicals/nutrients. The activated SSP nozzles 652 can selectively apply the chemicals/nutrients to the crop rows 660 (e.g., to the canopy of the crops in the crop rows 660). Alternatively, the activated SSP nozzles 652 can continuously apply the chemicals/nutrients to the crop rows 660 (e.g., similar to broadcast nozzles 621).

Figure 7:
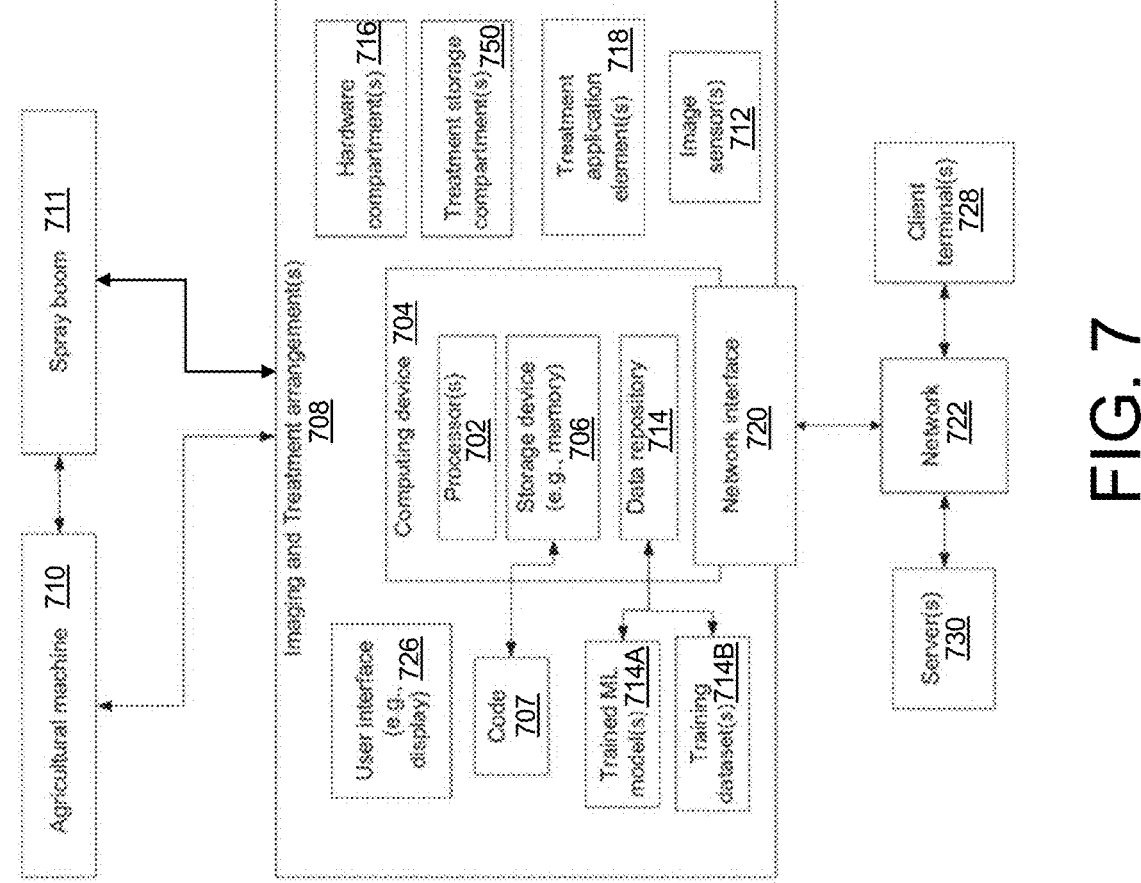
FIG. 7 is a block diagram of a system for selectively applying a treatment to a target region according to an embodiment.
Figure 7:

FIG. 7 is a block diagram of a system 70 for selectively applying a treatment to a target region according to an embodiment. System 70 can be the same as system(s) 10, 20, 30, 40, and/or 50.

System 70 includes one or more imaging and treatment arrangements 708 connected to and/or mounted on an agricultural machine 710, for example, a tractor, an airplane, an off-road vehicle, or a drone. Agricultural machine 710 can be the same as agricultural machine 100. Agricultural machine 710 can include and/or can be connected to a spray boom 711 and/or to another boom. Spray boom 711 can be the same as spray boom 130. Imaging and treatment arrangements 708 may be arranged along a length of the agricultural machine 710 and/or of the spray boom 711. For example, the imaging and treatment arrangements 708 can be evenly spaced every 1-3 meters along the length of spray boom 711. Spray boom 711 may be long, for example, 10-50 meters, or another length. Spray boom 711 may be pushed or pulled by agricultural machine 710. In another embodiment, the system 70 only includes one imaging and treatment arrangement 708.

An example imaging and treatment arrangement 708 is depicted for clarity, but it is to be understood that system 70 may include multiple imaging and treatment arrangements 708. It is noted that each imaging and treatment arrangement 708 may include all components described herein. Alternatively, one or more imaging and treatment arrangements 708 can share one or more components, for example, multiple imaging and treatment arrangements 708 can share a common computing device 704, common memory 706, and/or common processor(s) 702.

Each imaging and treatment arrangement 708 includes one or more image sensors 712 that acquire images of the agricultural field. Examples of an image sensor 712 include a color sensor, optionally a visible light-based sensor, for example, a red-green-blue (RGB) sensor such as CCD and/or CMOS sensors, and/or other cameras (e.g., cameras 640) and/or other sensors such as an infra-red (IR) sensor, a near-infrared sensor, an ultraviolet sensor, a fluorescent sensor, a LIDAR sensor, an NDVI sensor, a three-dimensional sensor, and/or a multispectral sensor. Image sensor(s) 712 are arranged and/or positioned to capture images of a portion of the agricultural field (e.g., located in front of image sensor(s) 712 and along a direction of motion of agricultural machine 710).

A computing device 704 receives the image(s) from image sensor(s) 712, for example, via a direct connection (e.g., local bus and/or cable connection and/or short-range wireless connection), a wireless connection and/or via a network. The image(s) are processed by processor(s) 702, which feeds the image into a trained machine learning (ML) model 714A (e.g., trained on a training dataset(s) 714B that include training images of agricultural fields with target weeds and training images of agricultural fields without target weeds). Training dataset(s) 714B are used to train the trained ML model 714A and may not be included in system 70 in some embodiments. The trained ML model 714A can be configured to detect a target growth, such as one or more weeds, within the image(s), that is separate from a desired growth (e.g., a crop). One treatment storage compartment 750 may be selected from multiple treatment storage compartments according to the outcome of trained ML model 714A, for administration of a treatment by one or more treatment application element(s), as described herein. For example, an SSP tank (e.g., SSP tank 112, 312A, 312B) can be selected to provide treatment in response to the detection of a target weed. In some embodiments, only the valve(s) 630 (FIG. 6) associated with the camera 640 (FIG. 6) (or other image sensor(s) 712) and with the position(s) of the detected weed in the image(s) are activated to precisely target the detected weed. In contrast, the broadcast tank (e.g., broadcast tank 111) can continually apply treatment to all or substantially all areas of the agricultural field, for example as a preventative for future weed growth and/or as a general herbicide.

Hardware processor(s) 702 of computing device 704 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 702 may include a single processor, or multiple processors (homogenous or heterogeneous) arranged for parallel processing, as clusters and/or as one or more multi core processing devices.

Storage device (e.g., memory) 706 stores code instructions executable by hardware processor(s) 702, for example, a random-access memory (RAM), read-only memory (ROM), and/or a storage device, for example, non-volatile memory, magnetic media, semiconductor memory devices, hard drive, removable storage, and optical media (e.g., DVD, CD-ROM). Memory 706 stores code 707 that implements one or more features and/or instructions to be executed by the hardware processor(s) 702. Memory 706 can comprise or consist of solid-state memory and/or a solid-state device.

Computing device 704 may include a data repository 714 (e.g., storage device(s)) for storing data, for example, trained ML model(s) 714A which may include a detector component and/or a classifier component. The data repository 714 also stores the captured real-time images taken with the respective image sensor 712. The data repository 714 may be implemented as, for example, a computer memory, a local hard-drive, a solid-state drive, a solid-state memory, virtual storage, a removable storage unit, an optical disk, a storage device, and/or as a remote server and/or computing cloud (e.g., accessed using a network connection). Additional details regarding the trained ML model(s) 714A, the training dataset(s) 714B, and/or other components of system 70 are described in U.S. Pat. No. 11,393,049, titled "Machine Learning Models For Selecting Treatments For Treating an Agricultural Field," which is hereby incorporated by reference.

Computing device 704 is in communication with one or more treatment storage compartment(s) (e.g., tanks) 750 and/or treatment application elements 718 (e.g., including respective valves such as valves 630) that apply treatment for treating the field and/or plants growing on the field. There may be two or more treatment storage compartment(s) 750, for example, one or more compartments (e.g., SSP tank 112, 312A, 312B) storing chemical(s) specific to a target growth such as one or more weeds, and another one or more compartments (e.g., broadcast tank 111) storing broad chemical(s) that are non-specific to target growths such as designed for different types of weeds and/or for the prevention of weed growth. One or more of the treatment storage compartment(s) 750 can comprise a portion of a direct injection system. In an embodiment, the system 70 can include a first direct injection system for the chemical(s) specific to a target growth (e.g., one or more weeds) and/or a second direct injection system for the broad chemical(s) that are non-specific to target growths.

There may be one or multiple treatment application elements 718 connected to the treatment storage compartment(s) 750, for example, one or more spot sprayers (e.g., SSP nozzles 622) connected to a first compartment (e.g., SSP tank 112, 312A, 312B) storing specific chemicals for one or more weeds, and one or more broad sprayers (e.g., broadcast nozzles 621) connected to a second compartment (e.g., broadcast tank 111) storing non-specific chemicals for different types of weeds. A respective valve (e.g., valve 630) can be opened and closed to drive fluid through each spot sprayer(s) 622. Alternatively, each spot sprayer 622 can include a respective valve (e.g., valve 630).

Other examples of treatments and/or treatment application elements 718 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-water jets for pruning crops and/or removing weeds), thermal treatment application elements that apply a thermal treatment, steam treatment application elements that apply a steam treatment, and laser treatment application elements that apply a laser treatment.

Computing device 704 and/or imaging and treatment arrangement 708 may include a network interface 720 for connecting to a network 722, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 704 and/or imaging and treatment arrangement 708 may communicate with one or more client terminals 728 (e.g., smartphones, mobile devices, laptops, smart watches, tablets, desktop computer) and/or with a server(s) 730 (e.g., web server, network node, cloud server, virtual server, virtual machine) over network 722. Client terminals 728 may be used, for example, to remotely monitor imaging and treatment arrangement(s) 708 and/or to remotely change parameters thereof. Server(s) 730 may be used, for example, to remotely collect data from multiple imaging and treatment arrangement(s) 708 optionally of different agricultural machines, for example, to create new training datasets and/or update exiting training datasets for updating the ML models with new images.

Network 722 may be implemented as, for example, the internet, a local area network, a wire-area network, a virtual network, a wireless network, a cellular network, a local bus, a point-to-point link (e.g., wired), and/or combinations of the aforementioned.

Computing device 704 and/or imaging and treatment arrangement 708 includes and/or is in communication with one or more physical user interfaces 726 that include a mechanism for user interaction, for example, to enter data (e.g., define threshold and/or set of rules) and/or to view data (e.g., results of which treatment was applied to which portion of the field).

Example physical user interfaces 726 include, for example, a touchscreen, a display, gesture activation devices, a keyboard, a mouse, and/or voice-activated software using speakers and a microphone. Alternatively, client terminal 728 serves as the user interface by communicating with computing device 704 and/or server 730 over network 722.

Treatment application elements 718 may be adapted for spot spraying and/or broad (e.g., band) spraying, for example as described in U.S. Provisional Patent Application No. 63/149,378, filed on Feb. 15, 2021, and/or in U.S. Pat. No. 11,393,049, which are hereby incorporated by reference.

System 70 may include a hardware component 716 associated with the agricultural machine 710 for dynamic adaption of the herbicide applied by the treatment application element(s) 718 according to dynamic orientation parameter(s) computed by analyzing an overlap region of images captured by image sensors 712, for example as described in U.S. Provisional Patent Application No. 63/082,500, filed on Sep. 24, 2020, and/or in U.S. Pat. No. 11,393,049, which are hereby incorporated by reference.

FIG. 8 is a cross section of the spray boom 130 taken through plane 800 in FIG. 3A. The spray boom 130 includes a frame 810 having top and bottom supports 811, 812. A channel 820 is defined in the bottom support 812 for various components including the first and second fluid lines 141, 142, the broadcast nozzles 151, and the SSP nozzles 152. The channel 820 allows the broadcast nozzles 151 and the SSP nozzles 152 to be positioned at any location along the length of the spray boom 130 without obstruction by the frame 810.

One of the cameras 640 and one of the lights 645 are also illustrated. In some embodiments, each camera 640 includes a camera cover 840 that can protect the respective cameras 640 from precipitation (e.g., rain, snow) from contact with other objects, such as bushes, in the agricultural field. The location of the cameras 640 between the top and bottom supports 811, 812 can further protect the cameras 640 from contact with other objects.

Figure 9:
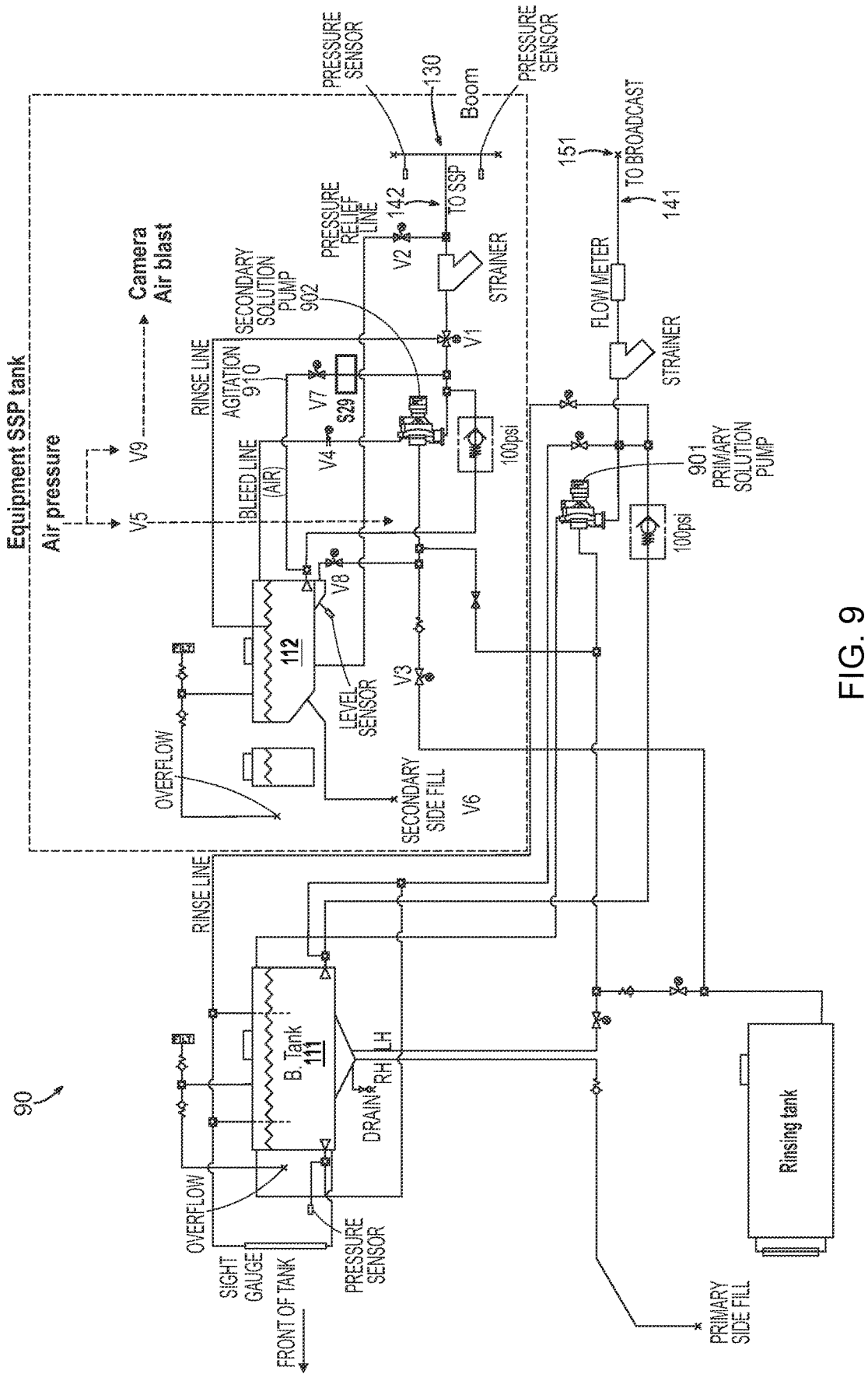
FIG. 9 is a schematic diagram of an example fluid circuit for a retrofit dual sprayer system that includes one SSP tank.

FIG. 9 is a schematic diagram of an example fluid circuit 90 for a retrofit dual sprayer system that includes one SSP tank and a recirculating spray boom. Fluid circuit 90 can be used with systems 10, 20, 40, or 50.

The fluid circuit 90 includes first and second pumps 901, 902 that are in fluid communication with the broadcast and SSP tanks 111, 112 and with the first and second fluid lines 141, 142 and broadcast and SSP nozzles 151, 152, respectively. The fluid circuit also illustrates an example of how the hydraulics can be shared between the first and second pumps 901, 902.

A plurality of valves V1-V9 can be used in the fluid circuit 90. Valves V1 and V3 can be used for a manual rocker cabin. V1 is fluidly coupled to V3. V2 can be used for GE control. During air purge, V5 is opened and V2-V4, V7, and V8 are closed. V6 can be a manual valve. V7 can be used as a manual rocker for agitation to recirculate fluid into the SSP tank 111 using recirculation/agitation line 910. V8 can be used as a manual valve or as a manual rocker. V9 can be opened to spray air across the lenses of cameras 640 to remove dirt, debris, and/or precipitation. S29 can be a pressure sensor. V1 and V3 function together when rinsing, as indicated by the dashed line.

Figure 10:
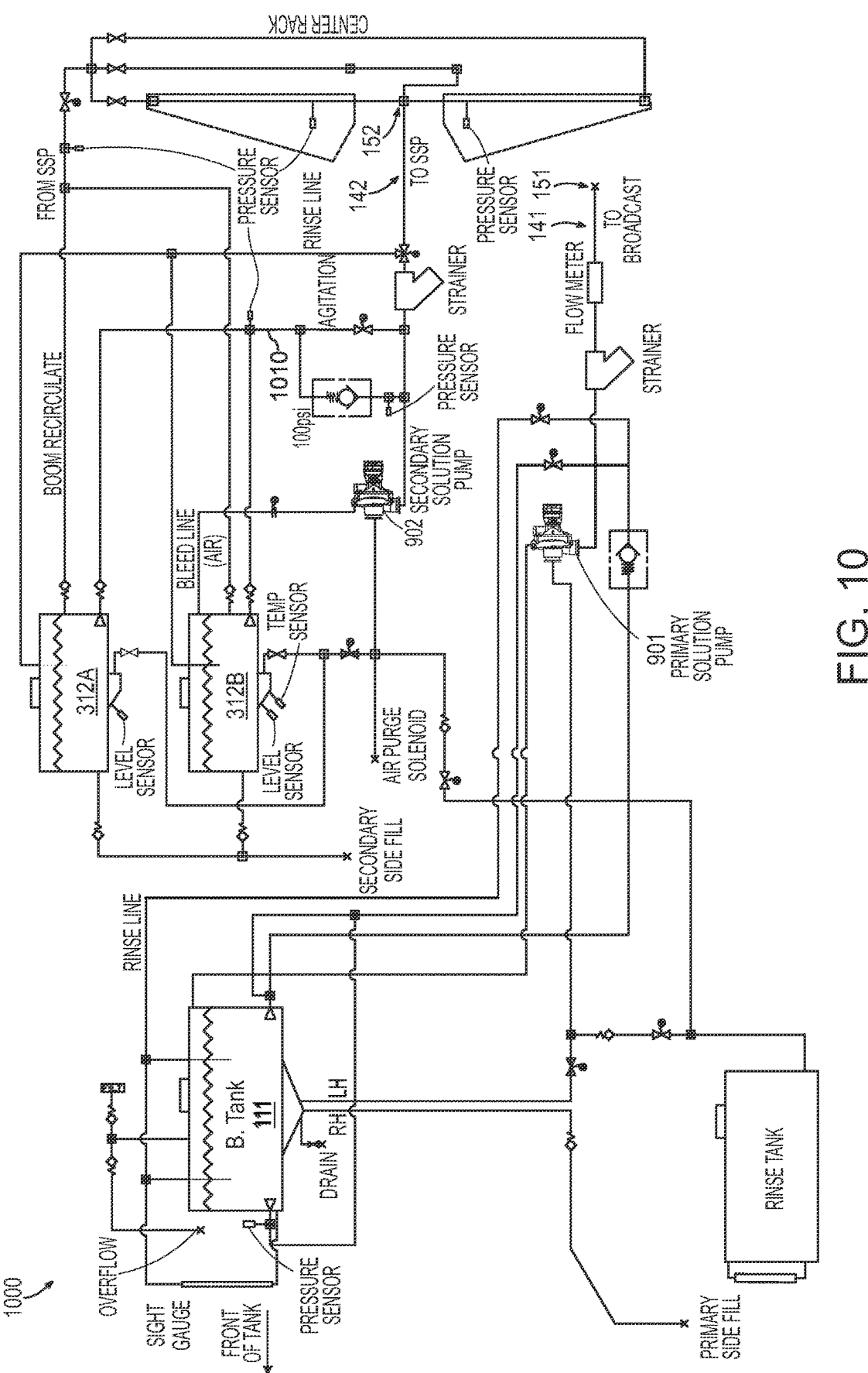
FIG. 10 is a schematic diagram of an example fluid circuit for a retrofit dual sprayer system that includes a plurality of SSP tanks.

FIG. 10 is a schematic diagram of an example fluid circuit 1000 for a retrofit dual sprayer system that includes dual SSP tanks and a recirculating spray boom. Fluid circuit 1000 can be used with system 30. Fluid circuit 1000 the same as fluid circuit 90 except that fluid circuit 1000 is configured for first and second SSP tanks 312A, 312B instead of SSP tank 112. For example, fluid circuit 1000 includes a recirculation/agitation line 1010 that is configured to recirculate fluid back to the first and second SSP tanks 312A, 312B for agitation/mixing.

The retrofit SSP tank(s) can provide one or more technical advantages. One technical advantage can be that the smaller size of the SSP tank(s), compared to the broadcast tank, allow the SSP tank(s) to be mounted onto an OEM broadcast spray system, which cannot support large tanks. Another technical advantage can be that the smaller size of the SSP tank(s), compared to the broadcast tank, is configured for the chemicals in the SSP tank(s) and in the broadcast tank to be consumed at approximately the same rate such that the SSP tank(s) and in the broadcast tank can be refilled at approximately the same time. Significantly less volume of chemicals is needed for SSP spraying compared to broadcast spraying.

Another technical advantage can be that the smaller size of the SSP tank(s), compared to the broadcast tank, allow the SSP tank(s) to be installed in most cases with minimum changes to the hydraulics of the sprayer. In most cases, an additional hydraulic tank and/or an additional hydraulic pump is/are not needed to support the SSP tank(s). Thus, the pumps for the broadcast tank and the SSP tank(s) can share a hydraulic tank and/or a hydraulic pump. Another technical advantage can be that the smaller size of the SSP tank(s), compared to the broadcast tank, allows the rinse tank to be shared between the SSP tank(s) and the broadcast tank without increasing the size or volume of the rinse tank.

Another technical advantage can be that the smaller size of the SSP tank(s), compared to the broadcast tank, allows the SSP tank(s) to be moved by the user/owner of the system in case of major service for the system (e.g., in case of major service at the location(s) of the SSP tank(s)).

Another technical advantage can be that the smaller size of the SSP tank(s), compared to the broadcast tank, allows passive agitation (e.g., via a recirculation/agitation line) to be used for the SSP tank(s). In contrast, activate agitation is used for the broadcast tank.

Another technical advantage can be that the smaller size of the SSP tank(s), compared to the broadcast tank, allows the SSP tank(s) to be installed and retrofit onto a single-sprayer system without a significant change (or any change) in the center of gravity of the single-sprayer system. For example, the center of gravity is between the wheels of the agricultural vehicle both in the retrofit dual sprayer system and in the OEM broadcast spray system (i.e., before the SSP tank(s) is/are added/retrofit).

Another technical advantage can be that smaller size of the SSP tank(s), compared to the broadcast tank, allows the single-sprayer system to be retrofit in the field (e.g., at the location of the single-sprayer system) without bringing the single-sprayer system to the manufacture warehouse or service location. Retrofitting includes adding the SSP tank(s), the corresponding fluid lines, pump, and components on the spray boom (e.g., cameras, lights, SSP nozzles, sensors, valves, etc.).

Another technical advantage can be that smaller size of the SSP tank(s), compared to the broadcast tank, allows the single-sprayer system to be retrofit as a full system using a kit (e.g., that includes the SSP tank(s), the corresponding fluid lines, pump, and components on the spray boom (e.g., cameras, lights, SSP nozzles, sensors, valves, etc.) to be connected to the single-sprayer system.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A retrofit dual sprayer system comprising:
an agricultural vehicle having a broadcast tank mounted thereon, the broadcast tank having a first volumetric capacity for holding one or more general-application liquid chemicals for preventing undesirable plants from growing in an agricultural field;
a selective-spot spray (SSP) tank retrofitly mounted on the agricultural vehicle, the SSP tank having a second volumetric capacity for holding one or more specific liquid chemicals for treating one or more target weeds growing in the agricultural field, the second volumetric capacity greater than or equal to about 5% of the first volumetric capacity and less than or equal to about 30% of the first volumetric capacity;
a spray boom attached to the agricultural vehicle, the spray boom including a plurality of broadcast nozzles mounted on the spray boom, the broadcast nozzles only fluidly coupled to the broadcast tank; and
a plurality of SSP nozzles retrofitly mounted on the spray boom, the SSP nozzles only fluidly coupled to the SSP tank.

2. The system of claim 1, further comprising:
a plurality of image sensors retrofitly mounted on the spray boom and configured to capture images of the agricultural field in a direction of travel of the agricultural vehicle, each image sensor having a field of view that is aligned with and corresponds with one or more of the SSP nozzles;
one or more retrofit computers in electrical communication with the image sensors, the retrofit computer(s) configured to receive captured images and detect the one or more target weeds in the captured images using a trained machine learning (ML) model, the trained ML model having been trained with first and second training images of agricultural fields, the first training images including the one or more target weeds, the second training images not including the one or more target weeds; and
a plurality of retrofit electromechanically actuated valves, each retrofit electromechanically actuated valve fluidly coupled to a respective SSP nozzle, the retrofit computer(s) in electrical communication with the retrofit electromechanically actuated valves to open each retrofit electromechanically actuated valve in response to a detection of the one or more target weeds in the captured images.

3. The system of claim 1, wherein:
the broadcast tank includes a first filling line,
the SSP tank includes a second filling line, and
an internal diameter of the second filling line is smaller than an internal diameter of the first filling line.

4. The system of claim 1, wherein an agitation line is fluidly coupled to the SSP tank to agitate the specific liquid chemical(s) in the SSP tank.

5. The system of claim 1, wherein a recirculation line is fluidly coupled to the SSP tank and to one or more SSP fluid lines on the spray boom, the SSP line(s) fluidly coupled to the SSP nozzles.

6. The system of claim 1, wherein:
a first pump is fluidly coupled to the broadcast tank,
a second pump is fluidly coupled to the SSP tank, and
the first and second pumps are fluidly coupled to a shared hydraulic tank and/or to a shared hydraulic pump.

7. The system of claim 1, wherein:

the agricultural vehicle includes a plurality of wheels, and a center of gravity of the system remains between the wheels when the system includes the SSP tank compared to when the SSP tank is removed.

8. A retrofit dual sprayer system comprising:

an agricultural vehicle having a broadcast tank mounted thereon, the broadcast tank having a first volumetric capacity for holding one or more general-application liquid chemicals for preventing undesirable plants from growing in an agricultural field;

a plurality of selective-spot spray (SSP) tanks retrofitly mounted on the agricultural vehicle, the SSP tanks having a combined volumetric capacity for holding one or more specific liquid chemicals for treating one or more target weeds growing in the agricultural field, the combined volumetric capacity greater than or equal to about 5% of the first volumetric capacity and less than or equal to about 30% of the first volumetric capacity;

a spray boom attached to the agricultural vehicle, the spray boom including a plurality of broadcast nozzles mounted on the spray boom, the broadcast nozzles only fluidly coupled to the broadcast tank; and a plurality of SSP nozzles retrofitly mounted on the spray boom, the SSP nozzles only fluidly coupled to the SSP tanks.

9. A retrofit dual sprayer system comprising:

an agricultural vehicle having a broadcast tank mounted thereon, the broadcast tank having a first volumetric capacity for holding one or more general-application liquid chemicals for preventing undesirable plants from growing in an agricultural field;

a selective-spot spray (SSP) tank retrofitly mounted on the agricultural vehicle, the SSP tank having a second volumetric capacity for holding a liquid chemical for treating a target agricultural crop growing in crop rows in an agricultural field, the second volumetric capacity greater than or equal to about 5% of the first volumetric capacity and less than or equal to about 30% of the first volumetric capacity;

a spray boom attached to the agricultural vehicle, the spray boom including a plurality of broadcast nozzles mounted on the spray boom, the broadcast nozzles only fluidly coupled to the broadcast tank;

a plurality of SSP nozzles retrofitly mounted on the spray boom, the SSP nozzles only fluidly coupled to the SSP tank;

one or more retrofit computers in electrical communication with the SSP nozzles; and a plurality of retrofit electromechanically actuated valves, each retrofit electromechanically actuated valve fluidly coupled to a respective SSP nozzle, the computer(s) in electrical communication with the retrofit electromechanically actuated valves and configured to open the retrofit electromechanically actuated valves for only the SSP nozzles that are aligned with respective crop rows.

10. The system of claim 9, further comprising a plurality of image sensors retrofitly mounted on the spray boom and configured to capture images of the agricultural field in a direction of travel of the agricultural vehicle, each image sensor having a field of view that is aligned with and corresponds with one or more of the SSP nozzles, wherein:

the retrofit computer(s) is/are configured to receive captured images from the image sensors and detect the target agricultural crop in the captured images using a trained machine learning (ML) model, the trained ML model having been trained with first and second training images of agricultural fields, the first training images including the target agricultural crop, the second training images not including the target agricultural crop, and the retrofit computer(s) is/are configured to automatically open the retrofit electromechanically actuated valves for only the SSP nozzles that are aligned with respective crop rows using the captured images and the trained ML model.

11. The system of claim 9, wherein the liquid chemical comprises a fertilizer.

12. The system of claim 9, wherein the liquid chemical comprises an herbicide.

13. The system of claim 9, wherein the computer(s) is/are configured to open the retrofit electromechanically actuated valves for every third SSP nozzle.

* * * * *